United States Patent [19]

Hashida et al.

[11] Patent Number: 4,953,918
[45] Date of Patent: Sep. 4, 1990

[54] MODULATOR FOR USE IN AN ANTI-LOCK BRAKE CONTROL SYSTEM

[75] Inventors: Koichi Hashida; Teruhisa Kohno, both of Itami, Japan

[73] Assignee: Sumitomo Electric Industries Ltd., Osaka, Japan

[21] Appl. No.: 401,845

[22] Filed: Sep. 1, 1989

[30] Foreign Application Priority Data

Sep. 3, 1988 [JP] Japan ............................ 63-116187[U]

[51] Int. Cl.$^5$ ................................................ B60T 8/46
[52] U.S. Cl. ...................................... 303/115; 303/116
[58] Field of Search .................... 188/181 A; 303/110, 303/111, 113, 114, 115, 116, 117, 119

[56] References Cited

U.S. PATENT DOCUMENTS 4,690,465  9/1987  Takeda et al. ...................... 303/119

FOREIGN PATENT DOCUMENTS

| 0051800 | 5/1982 | European Pat. Off. |
| 8301929 | 6/1983 | European Pat. Off. |
| 0140863 | 5/1985 | European Pat. Off. |
| 0171901 | 2/1986 | European Pat. Off. |
| 0268440 | 5/1988 | European Pat. Off. |
| 8001783 | 9/1980 | World Int. Prop. O. |

OTHER PUBLICATIONS

Akebono Brake Kogyo K.K., "Anti-Skid Control Device", Patent Abstracts of Japan, Jul. 5, 1983, vol. 7, No. 153 (M-226) (1298).
Akebono Brake Kogyo K.K. "Antiskid Controller", Patent Abstract of Japan, Aug. 5, 1983, vol. 7, No. 177, M-233 (1322).

*Primary Examiner*—Duane A. Reger
*Attorney, Agent, or Firm*—Cushman, Darby & Cushman

[57] ABSTRACT

An anti-lock brake control system for an automobile vehicle includes an anti-lock modulator having a single housing structure, which accommodates plural sets of flow control valves and solenoid-operated discharge valves, a plurality of plunger pumps and a plurality of reservoirs. The valves in each set are disposed in line with and in series-connected fashion with each other. The valve sets and an electric motor having an eccentric drive shaft for driving the plunger pumps are disposed on respective sides of the longitudinal axis of the plunger pumps. All of the longitudinal axis of each valve set, that of each plunger pump and that of the eccentric drive shaft are laid perpendicular to one another.

2 Claims, 5 Drawing Sheets

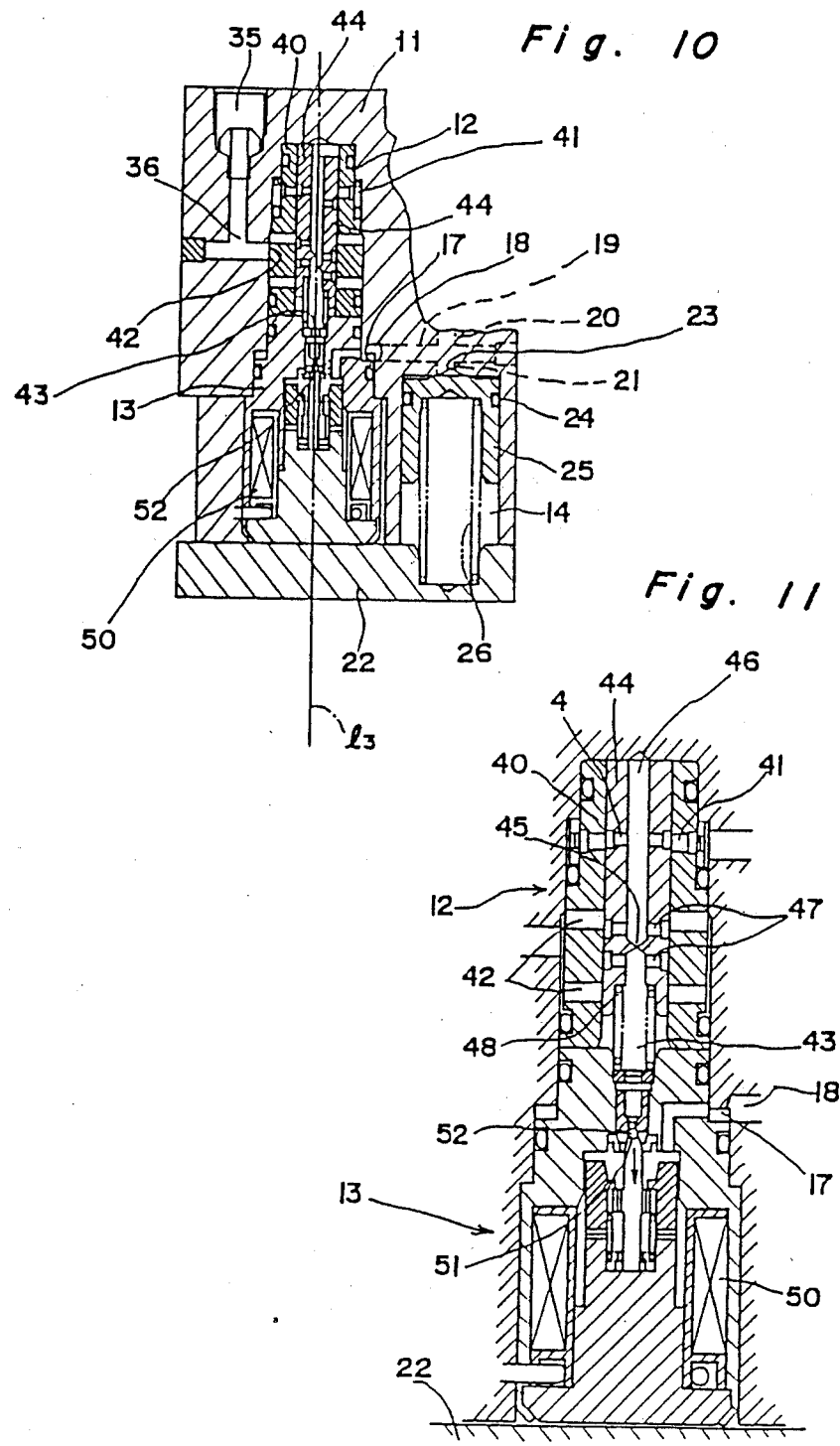

MODULATOR FOR USE IN AN ANTI-LOCK BRAKE CONTROL SYSTEM

BACKGROUND OF THE INVENTION

1. Field of the Invention

The present invention generally relates to an anti-lock brake control system for preventing lockup of vehicle wheel brakes during braking of the vehicle, and more particularly, to an anti-lock modulator constituting part of the anti-lock brake control system and provided with a housing structure accommodating flow control valves, discharge valves and plunger pumps.

2. Description of the Prior Art

Nowadays, automobile vehicles except relatively small vehicles are generally provided with an anti-lock brake control system. There is an increased demand for a small-sized system which can be applied to a relatively small automobile vehicle and manufactured at a low cost.

The Japanese Patent Publication No. 49-28307 discloses an anti-lock brake control system in which two solenoid valves are provided for each of four wheels for controlling brake pressure in three modes, i.e., pressure reducing, holding and increasing modes.

The British Patent Publication No. 851260 discloses another anti-lock brake control system which can be formed into a compact size at a reduced cost as compared with the aforementioned system. In this system, the anti-lock brake control is done in two modes i.e., pressure reducing and gradually increasing modes using a single solenoid valve and a flow control valve, which is not operated by a solenoid, for each wheel.

FIGS. 1 to 3 depict an anti-lock modulator for use in the system mentioned above, which is provided with two spaced housings 1 and 2. The upper housing 1 accommodates a flow control valve 3 while the lower housing 2 accommodates a plunger pump 4. A solenoid-operated discharge valve 5 is sandwiched between these two housings 1 and 2. A reservoir 8 accommodating a piston 6 and a compression spring 7 for biasing the piston 6 is generally provided between the discharge valve 5 and the plunger pump 4 in the direction of flow of working fluid. In this modulator, the reservoir 8 is formed in a lower portion of the lower housing 2 and closed by a plug 9.

As described above, the conventional modulator as shown in FIGS. 1 to 3 is comprised of the two spaced housings 1 and 2, the flow control valve 3 and the plunger pump 4 accommodated in these two housings 1 and 2, respectively, and the discharge valve 5 sandwiched between the housings 1 and 2. Accordingly, a fluid passage is necessarily required for allowing the communication of the working fluid between the spaced two housings 1 and 2. To this end, a pipe 10 is occasionally employed which is securely sandwiched between the two housings 1 and 2. However, this kind of modulator is disadvantageous in size, cost, reliability or the like.

Moreover, since the reservoir 8 needs the plug 9, not only the number of parts but assembling processes increase, resulting disadvantageously in an increased cost.

SUMMARY OF THE INVENTION

Accordingly, the present invention has been developed with a view to substantially eliminating the above described disadvantages inherent in the prior art modulator for use in an anti-lock brake control system, and has for its essential object to provide an improved modulator which can reduce the number of parts and the assembling processes.

Another important object of the present invention is to provide an anti-lock modulator of the above described type which can be formed into a compact size and manufactured at a low cost.

In accomplishing these and other objects, the present invention is directed to an anti-lock modulator for use in an anti-lock brake control system for an automobile vehicle, which system including: a master cylinder; a main fluid passage means communicating between the master cylinder and at least one wheel brake; a recirculating passage means branched off from the main fluid passage means for recirculating a fluid medium from the main fluid passage means back to an upstream portion of the main fluid passage means with respect to the direction of flow towards the wheel brake; an electric motor having an eccentric drive shaft; a motor-driven plunger pump means disposed on the recirculating passage means and having a longitudinal axis lying perpendicular to the eccentric drive shaft; a normally closed, solenoid-operated discharge valve means having a longitudinal axis and disposed on a portion of the recirculating passage means between that portion of the main fluid passage means, at which the recirculating passage means is branched off from the main fluid passage means, and the plunger pump means, said discharge valve means being adapted to control the flow of the fluid medium therethrough; a flow control valve means having a longitudinal axis and including an inlet port communicated with the master cylinder through the main fluid passage means, a first outlet port communicated with the wheel brake, a second outlet port communicated with the recirculating passage means, a spool having an orifice defined therein and supported for movement between inoperative and operative positions for controlling the communication between the inlet port and one of the first and second outlet ports, and a biasing spring means for biasing the spool to the inoperative position. The spool is held at the inoperative position in the event of occurrence of a lockup condition to allow a large amount of fluid medium to flow from the inlet port towards the first outlet port. The discharge valve means is electrically energized, when a pressure applied to the wheel brake is reduced during the occurrence of the lockup condition, to open thereby to cause the spool to move against the biasing spring to establish a fluid discharge circuit between the first and second outlet ports. This discharge valve means is deenergized, when the pressure applied to the wheel brake is increased during the occurrence of an anti-lock condition, to close thereby to establish a restricted fluid circuit leading from the inlet port to the second outlet port through the orifice. Furthermore, the spool is moved back to the inoperative position as biased by the biasing spring when the difference in pressure between the inlet port and the first outlet port becomes small.

In accordance with the present invention, the anti-lock modulator is featured by a single housing structure accommodating the flow control valve means and the discharge valve means in line with and in series-connected fashion with each other, both said flow control valve means and said discharge valve means and said electric motor being disposed on respective sides of the longitudinal axis of the plunger pump means, all of the longitudinal axis of each of the flow control valve means and the discharge valve means, that of the plunger pump means and that of the eccentric drive shaft being laid perpendicular to one another.

In another aspect of the present invention, the housing structure of the anti-lock modulator comprises a piston means housed in a bore formed therein and facing a fluid pressure in the recirculating passage means on its one side and an atmospheric pressure on its other side, a reservoir means defined by the piston means and the bore in parallel with the discharge valve means, a sealing means mounted along the periphery of the piston means for sealing the reservoir means, a biasing spring means in abutment at its one end with the piston means for biasing the piston means against the fluid pressure, and a stop means in abutment with the discharge valve means and the other end of the biasing spring means, said stop means closing an open end of the bore.

As described above, according to the present invention, since the flow control valve means and the discharge valve means are arranged in alignment with and in series-connected fashion with each other, they do not need respective stop plugs separately. The fact that the flow control valve means, the discharge valve means and the plunger pump means are all accommodated in a single housing structure does not require a fluid passage comprised of a pipe or the like which is required when the anti-lock modulator has two spaced housings. In addition, since the reservoir means is provided in parallel with the discharge valve means and the stop member for closing the open end of the bore formed in the housing structure is commonly used as a stop member for the discharge valve means, it becomes possible to reduce the number of parts and assembling processes. Accordingly, the anti-lock modulator of the present invention is economical and superior in reliability and can be formed small and lightweight.

BRIEF DESCRIPTION OF THE DRAWINGS

These and other objects and features of the present invention will become more apparent from the following description taken in conjunction with the preferred embodiment thereof with reference to the accompanying drawings, throughout which like parts are designated by like reference numerals, and wherein;

FIG. 10 is a section taken along the line X—X in FIG. 6; and

FIG. 11 is an enlarged sectional view of a set of a flow control valve and a discharge valve.

DETAILED DESCRIPTION OF THE PREFERRED EMBODIMENTS

Figure 1:
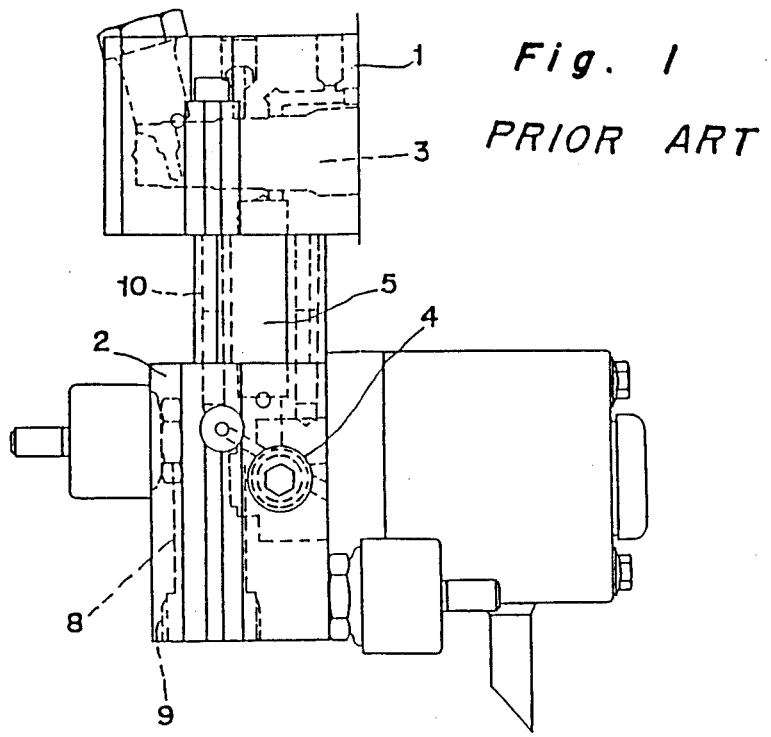
FIG. 1 is a front elevational view of a conventional anti-lock modulator for use in an anti-lock brake control system for an automobile vehicle.
Figure 2:
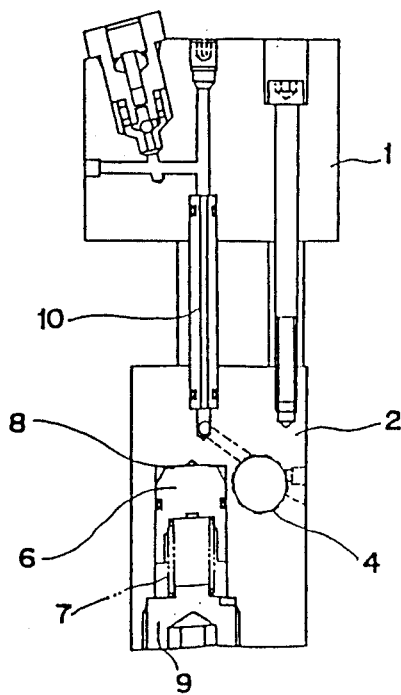
FIG. 2 is a sectional view of FIG. 1.
Figure 3:
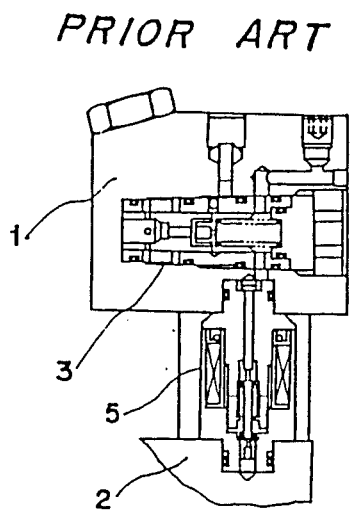
FIG. 3 is a partially sectional view of FIG. 1, illustrating the arrangement of a flow control valve and a discharge valve.
Figure 4:
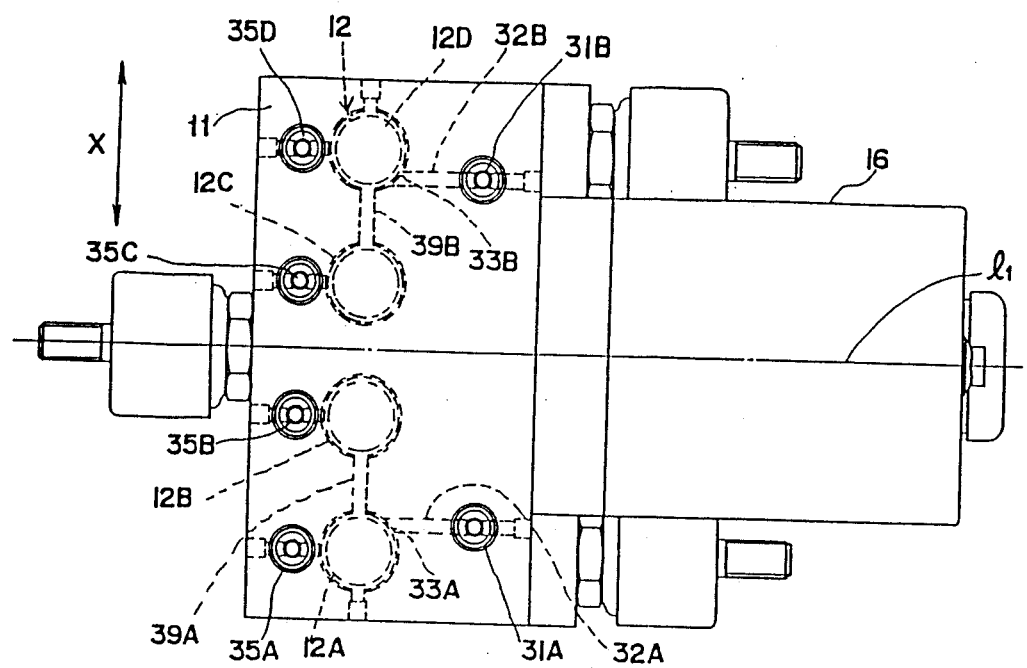
FIG. 4 is a top plan view of the anti-lock modulator according to one preferred embodiment of the present invention.
Figure 5:
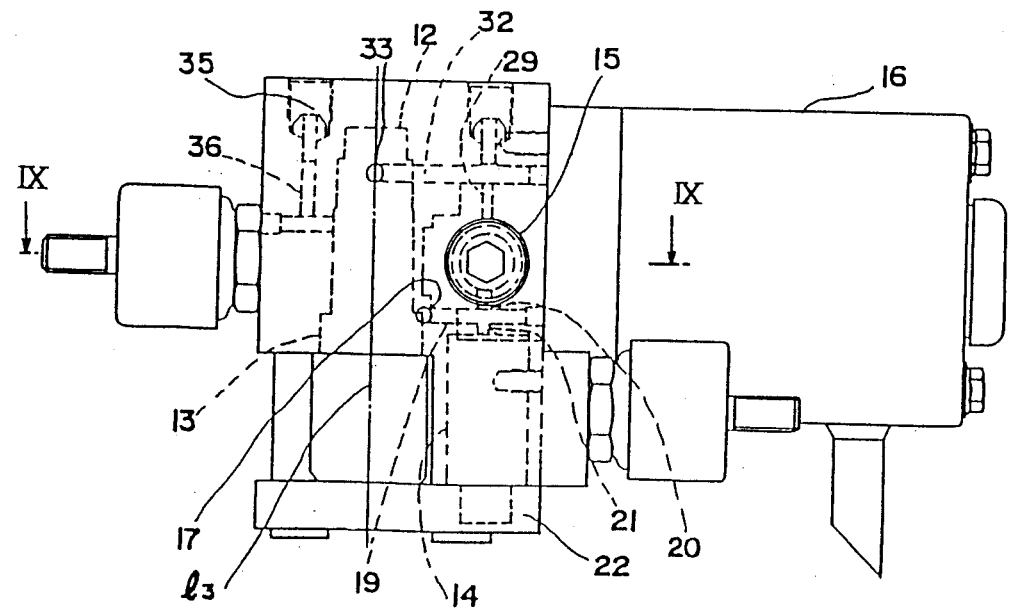
FIG. 5 is a front elevational view of FIG. 4.

Referring now to the drawings, there is shown in FIGS. 4 and 5, a housing 11 of an anti-lock modulator for use in an anti-lock brake control system, which is provided with a main fluid passage communicating between a master cylinder (not shown) and wheel brakes (not shown) for supplying working fluid from the former to the latter and a recirculating fluid passage branched off from the main fluid passage for recirculating the working fluid from the main fluid passage back to an upstream portion of the main fluid passage with respect to the direction of flow towards the wheel brakes. The housing 11 accommodates four valve sets of flow control valves 12 and solenoid-operated discharge valves 13, two reservoirs 14 and two plunger pumps 15. An electric motor 16 for driving the plunger pumps 15 is rigidly secured to one side of the housing 11.

As shown in the drawings, the housing 11 is in the form of a rectangular parallelepiped and has, at its left side as viewed in FIG. 4, four bores formed from below at regular intervals in the direction as shown by an arrow X. In the bores are housed respective valve sets of the flow control valves 12 (12A–12D) and the discharge valves 13 (13A–13D). The discharge valves 13A–13D are located below and in alignment with the corresponding flow control valves 12A–12D. Each valve set 12 and 13 is provided for the braking of one wheel. Because of this, the housing 11 accommodates four valve sets 12 and 13 for the braking of front and rear wheel pairs. More specifically, in FIG. 4, the valve sets 12A and 13A, 12B and 13B, 12C and 13C and 12D and 13D are provided for the braking of a right-hand front wheel, a left-hand rear wheel, a right-hand rear wheel and a left-hand front wheel, respectively.

Figure 6:
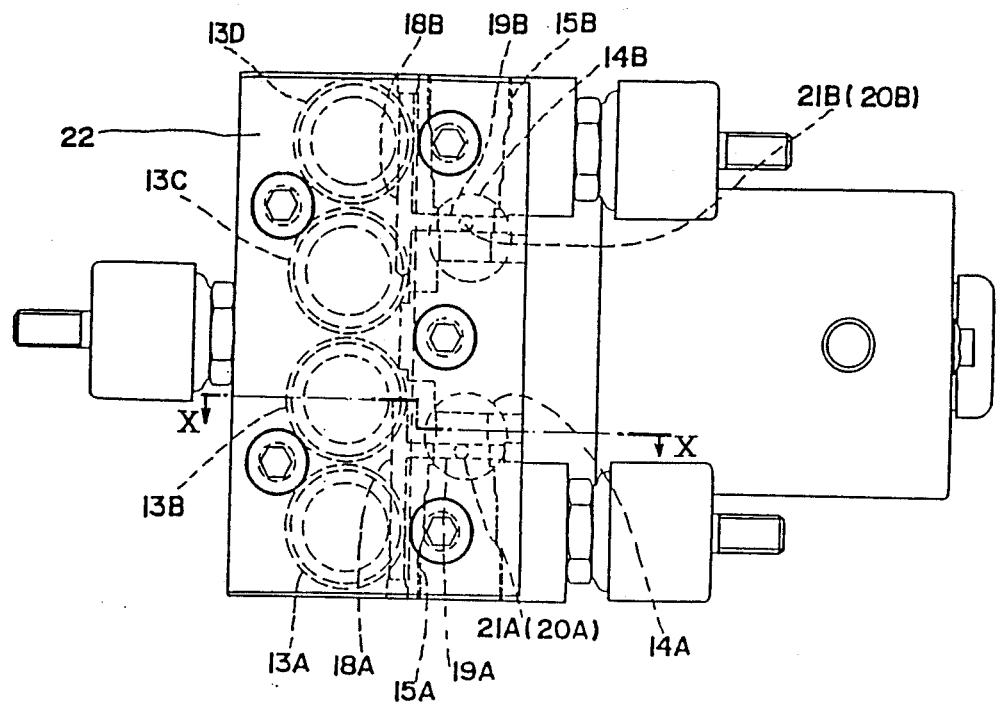
FIG. 6 is a bottom plan view of FIG. 4.

Each reservoir 14 and each plunger pump 15 are provided for adjoining two valve sets 12 and 13. More specifically, as shown in FIG. 6, the reservoir 14A and the plunger pump 15A are communicated with two discharge valves 13A and 13B for the right-hand front wheel and the left-hand rear wheel while the reservoir 14B and the plunger pump 15B are communicated with other two discharge valves 13C and 13D for the right-hand rear wheel and the left-hand front wheel.

Figure 7:
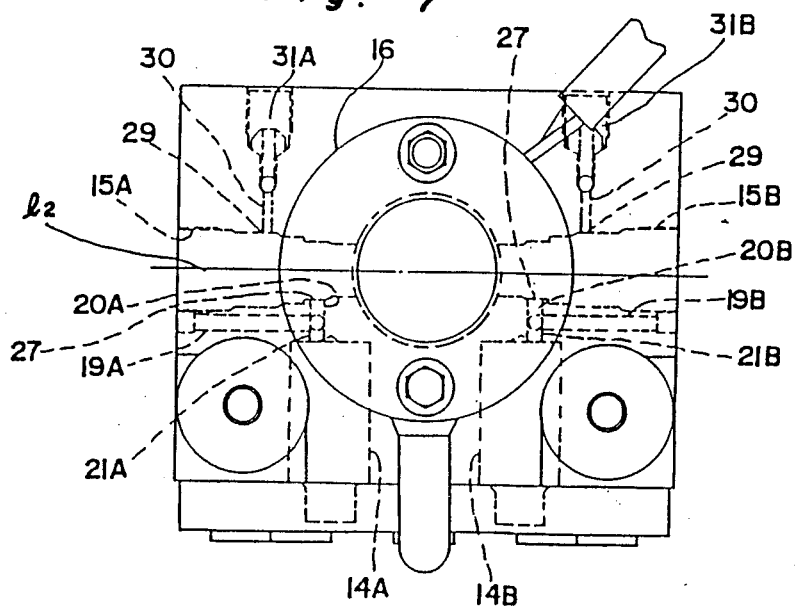
FIG. 7 is a right side elevational view of FIG. 4.
Figure 8:
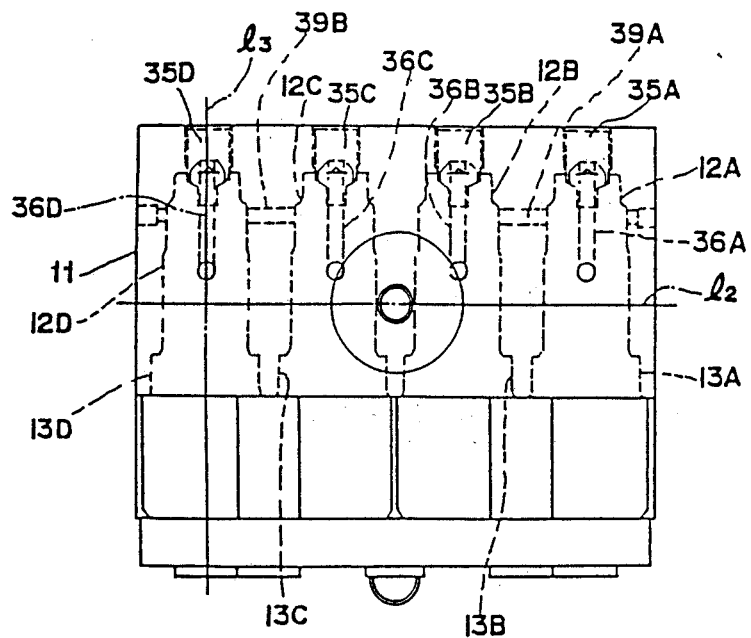
FIG. 8 is a left side elevational view of FIG. 4.

An outlet 17 from each discharge valve 13 is formed on its right side, as viewed in FIG. 5. Adjoining two outlets 17 from the discharge valves 13A and 13B and those from the discharge valves 13C and 13D are communicated with each other through respective fluid passages 18A and 18B formed horizontally in the direction of the arrow X. Branch passages 19A and 19B extend horizontally rightwards from respective fluid passages 18A and 18B. Furthermore, branch passages 20A, 21A and 20B, 21B extend vertically from respective branch passages 19A and 19B, as shown in FIG. 7.

The two reservoirs 14 (14A and 14B) are provided in respective bores formed between the discharge valves 13 and the electric motor 16. These bores are formed vertically in parallel with each other. Open ends of the bores accommodating the reservoirs 14 and those of the bores accommodating the discharge valves 13 are closed by a piece of bottom plate 22. Accordingly, the reservoirs 14 never require respective plugs for closing the open ends of the bores accommodating them. The reservoirs 14 are communicated at their upper inlets 23 with the vertically formed branch passages 21 and accommodate respective pistons 25, which are provided along the periphery of their upper portions with sealing means 24 and reciprocable in the reservoirs 14, as shown in FIG. 10. These pistons 25 are biased upwards against fluid pressure applied through the inlets 23 by means of compression springs 26 interposed between the pistons 25 and the bottom plate 22.

Figure 9:
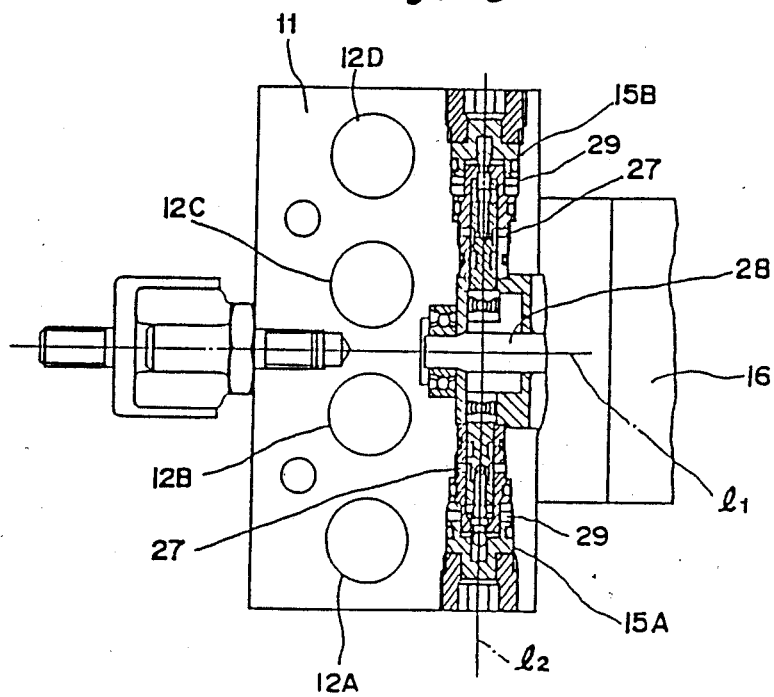
FIG. 9 is a section taken along the line IX—IX in FIG. 5.

Two bores for accommodating the plunger pumps 15 are formed horizontally above the reservoirs 14 in the direction perpendicular to the common center line 11 of the housing 11 and the electric motor 16 and formed symmetrically with respect to this center line 11. Fluid inlets 27 of the plunger pumps 15 are communicated with the branch passages 20. As shown in FIG. 9, the plunger pumps 15 are of known construction and driven by an eccentric drive shaft 28 of the electric motor 16 so that the working fluid drawn from the fluid inlets 27 may be discharged through fluid outlets 29. These fluid outlets 29 are communicated through vertically formed fluid passages 30 with inlet ports 31 (31A and 31B), which are further communicated with the master cylinder through piping.

The inlet ports 31A and 31B are communicated with inlets 33A and 33B of the flow control valves 12A and 12D through horizontally formed fluid passages 32A and 32B, respectively. Furthermore, fluid passages 39A and 39B are formed horizontally between adjoining two flow control valves 12A and 12B and between adjoining other two flow control valves 12C and 12D, respectively, for performing the communication between them. Accordingly, since the master cylinder is communicated with all of the flow control valves 12A to 12D, the working fluid can be supplied from the former to the latter.

As shown in FIGS. 4, 5, 8, 10 and 11, the flow control valves 12A to 12D are provided with respective first outlets 42, which are communicated with outlet ports 35 (35A-35D) through fluid passages 36 (36A-36D), respectively. The outlet ports 35 are open on their upper ends and formed in alignment with one another. The outlet ports 35A, 35B, 35C and 35D are communicated with a right-hand front brake, a left-hand rear brake, a right-hand rear brake and a left-hand front brake, respectively.

In the main fluid passage, the working fluid flows from the master cylinder to the wheel brakes via piping, the inlet ports 31 of the housing 11, the flow control valves 12, the outlet ports 35 and piping in this order. When the working fluid is required to return to the master cylinder, the fluid is branched from the flow control valves 12 and flows towards the master cylinder via the discharge valves 13, the reservoirs 14, the plunger pumps 15, the inlet ports 31 and piping in this order in the recirculating fluid passage.

In the housing 11, the valve sets of the flow control valves 12 and the discharge valves 13 and the electric motor 16 are disposed on respective sides of the center line 12 of the horizontally arranged plunger pumps 15. Furthermore, the center line 12 of the plunger pumps 15 is rendered to cross at right angles not only with the vertical center line 13 of each valve set 12 and 13 but with the horizontal center line 11 of the electric motor 16. More specifically, the flow control valves 12, the discharge valves 13 and the plunger pumps 15 are accommodated in the housing 11, to which the electric motor 16 is rigidly secured, so that the center line 11 of the electric motor 16, the center line 12 of the plunger pumps 15 and the center line 13 of each valve set 12 and 13 may cross at right angles with one another.

FIGS. 10 and 11 depict the construction of each valve set 12 and 13. This construction is disclosed in the Japanese Patent Application No. 63-135041 filed by the same assignee but will be discussed hereinafter briefly.

Each flow control valve 12 is comprised of a sleeve 40 fixedly mounted in the bore, a spool 44 reciprocably mounted in the sleeve 40 and a compression spring 48 for biasing the spool 44 upwards. The sleeve 40 is provided at its peripheral wall with inlets 41 communicating with the inlet port 31 through the fluid passages 32 and 39 and first outlets 42 communicating with the outlet port 35 through the fluid passage 36, and at its lower end with a second outlet 43 communicating with the recirculating fluid passage. The spool 44 is provided with a fluid passage 46 penetrating through the center thereof, an orifice 45 integrally formed therewith intermediately of the fluid passage 46 and a plurality of through-openings 47 formed at a peripheral wall thereof for selectively opening or closing the inlets 41 and the first outlets 42 of the sleeve 40 with the movement of the spool 44.

Each discharge valve 13 is placed in the same bore in alignment with the corresponding flow control valve 12 in series. The discharge valve 13 is comprised of a movable valve body 51, a valve seat 52 which is closed by the valve body 51 in the event of occurrence of a wheel lockup condition, and a coil which is energized for opening the valve seat 52 by moving the valve body 51 downwards in the event of occurrence of an anti-lock condition. When the valve seat 52 is opened under the anti-lock condition, the working fluid for the braking flows from the second outlet 43 of the flow control valve 12 into a fluid passage 53 constituting part of the recirculating fluid passage.

Under the lockup condition, the flow control valve 12 and the corresponding discharge valve 13 are communicated through a relatively wide fluid passage which permits a large amount of working fluid to flow because the spool 44 is located at its inoperative position under the influence of biasing force of the spring 48 and the inlets 41 and the first outlets 42 can communicate with each other through the fluid passage 46. On the other hand, when brake pressure is reduced, resulting in the anti-lock condition, the coil 50 of the discharge valve 13 is supplied with electricity so that the movable valve body 52 may be opened and allow the communication between the first outlets 42 and the second outlet 43 of the flow control valve 12. Accordingly, the working fluid flows from the wheel brake into the discharge valve 13 so that the wheel brake may be brought into the anti-lock condition. The working fluid led into the discharge valve 13 flows through the recirculating fluid passage into the inlet port 31 via the corresponding reservoir 14 and plunger pump 15. In contrast, when the brake pressure is required to increase to release the anti-lock condition, the coil 50 of the discharge valve 13 is switched off. In this event, a relatively narrow fluid passage defined by the inlets 41, the fluid passage 46, the orifice 45 and the second outlet 43 allow only a small amount of working fluid to flow. As a result, the difference in pressure between the inlets 41 and the first outlets 42 becomes small and the spool 44 is restored to its inoperative position It is noted that the flow control valve 12 is not limited by the foregoing embodiment and may be of any construction whereby, when the brake pressure is reduced under the lockup condition, the working fluid is discharge from the wheel brake into the discharge valve disposed in series, and when the brake pressure is increased under the anti-lock condition, the working fluid is allowed to flow through a relatively narrow fluid passage so that the discharge valve may be restored to its inoperative position, resulting in the lockup condition.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. In an anti-lock brake control system for an automobile vehicle, which system including:
    a master cylinder;
    a main fluid passage means communicating between the master cylinder and at least one wheel brake;
    a recirculating passage means branched off from the main fluid passage means for recirculating a fluid medium from the main fluid passage means back to an upstream portion of the main fluid passage means with respect to the direction of flow towards the wheel brake;
    an electric motor having an eccentric drive shaft;
    a motor-driven plunger pump means disposed on the recirculating passage means and having a longitudinal axis lying perpendicular to the eccentric drive shaft;
    a normally closed, solenoid-operated discharge valve means having a longitudinal axis and disposed on a portion of the recirculating passage means between that portion of the main fluid passage means, at which the recirculating passage means is branched off from the main fluid passage means, and the plunger pump means, said discharge valve means being adapted to control the flow of the fluid medium therethrough;
    a flow control valve means having a longitudinal axis and including at least one inlet port communicated with the master cylinder through the main fluid passage means, a plurality of first outlet ports communicated with the wheel brake, a second outlet port communicated with the recirculating passage means, a spool having an orifice defined therein and supported for movement between inoperative and operative positions for controlling the communication between the inlet port and one of the first and second outlet ports, and a biasing spring means for biasing the spool to the inoperative position;
    said spool being held at the inoperative position in the event of occurrence of a lockup condition to allow a large amount of fluid medium to flow from the inlet port towards the first outlet ports;
    said discharge valve means being electrically energized, when a pressure applied to the wheel brake is reduced during the occurrence of the lockup condition, to open thereby to cause the spool to move against the biasing spring to establish a fluid discharge circuit between the first and second outlet ports, but said discharge valve means being deenergized, when the pressure applied to the wheel brake is increased during the occurrence of an anti-lock condition, to close thereby to establish a restricted fluid circuit leading from the inlet port to the second outlet port through the orifice;
    said spool being moved back to the inoperative position as biased by the biasing spring when the difference in pressure between the inlet port and the first outlet ports becomes small;
    the improvement comprising:
    an anti-lock modulator provided with a single housing structure accommodating the flow control valve means and the discharge valve means in line with and in series-connected fashion with each other, both said flow control valve means and said discharge valve means and said electric motor being disposed on respective sides of the longitudinal axis of the plunger pump means, all of the longitudinal axes of each of the flow control valve means and the discharge valve means, the longitudinal axis of the plunger pump means and the longitudinal axis of the eccentric drive shaft being laid perpendicular to one another.

2. The system according to claim 1, wherein said housing structure further comprises a piston means housed in a bore formed therein and facing a fluid pressure in the recirculating passage means on its one side and an atmospheric pressure on its other side, a reservoir means defined by said piston means and said bore in parallel with said discharge valve means, a sealing means mounted along the periphery of said piston means for sealing said reservoir means, a biasing spring means in abutment at its one end with said piston means for biasing said piston means against the fluid pressure, and a stop means in abutment with said discharge valve means and the other end of said biasing spring means, said stop means closing an open end of said bore.

* * * * *